May 3, 1949.  E. P. FELCH, JR., ET AL  2,468,968
MAGNETIC FIELD STRENGTH INDICATOR

Filed April 20, 1943  5 Sheets-Sheet 1

INVENTORS E. P. FELCH, JR.
T. SLONCZEWSKI
BY
C. H. Huydt
ATTORNEY

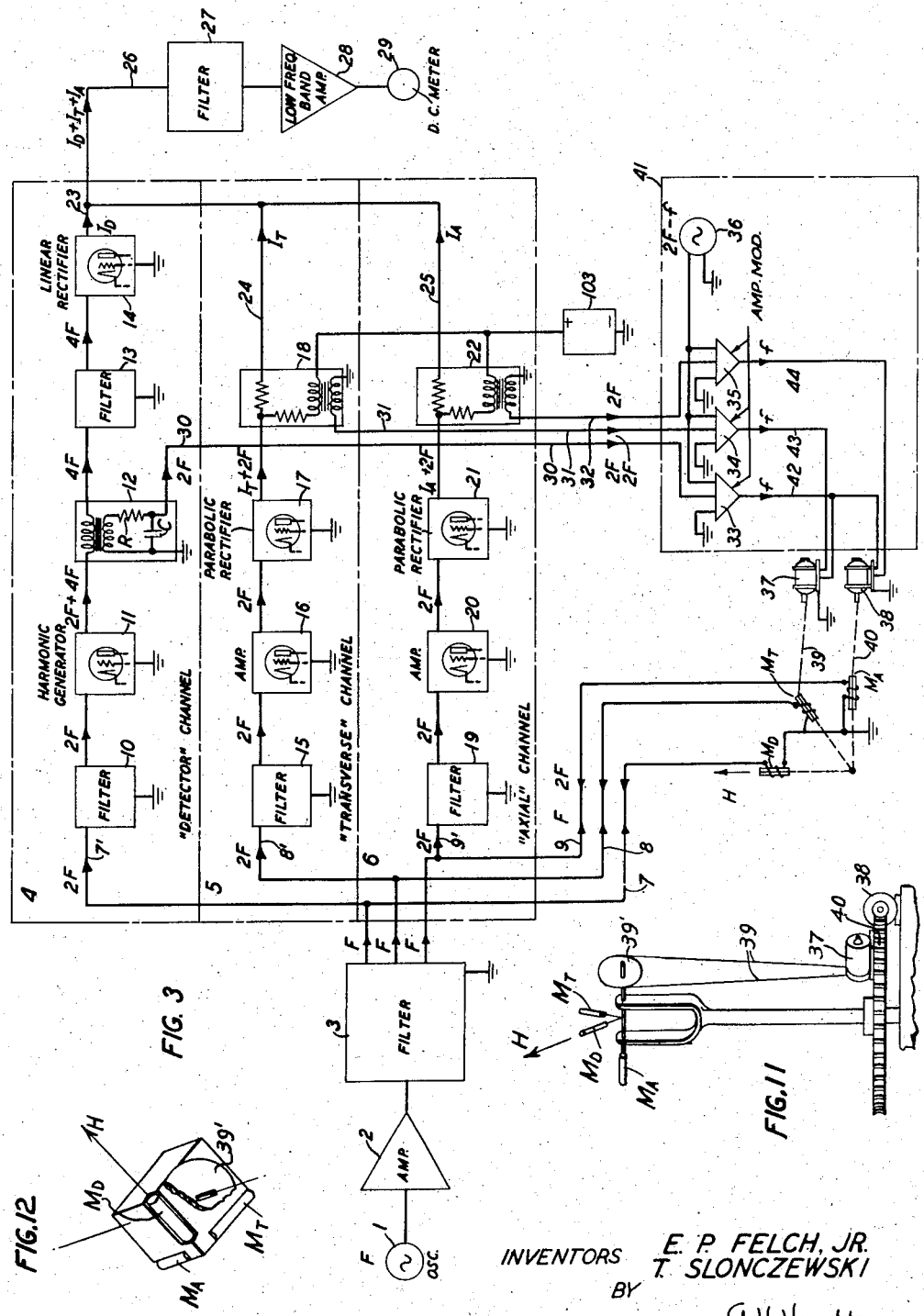
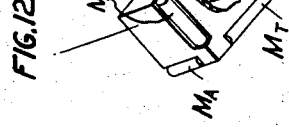

May 3, 1949.  E. P. FELCH, JR., ET AL  2,468,968
MAGNETIC FIELD STRENGTH INDICATOR
Filed April 20, 1943  5 Sheets-Sheet 5
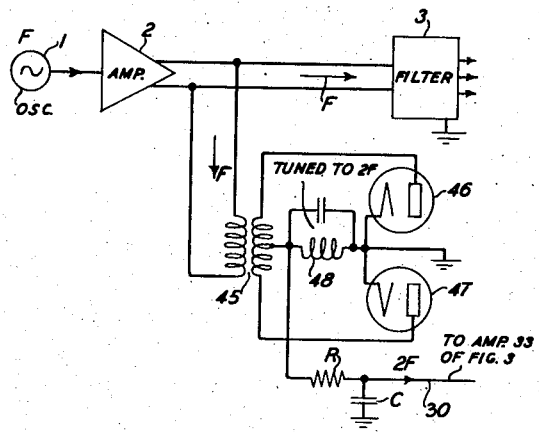
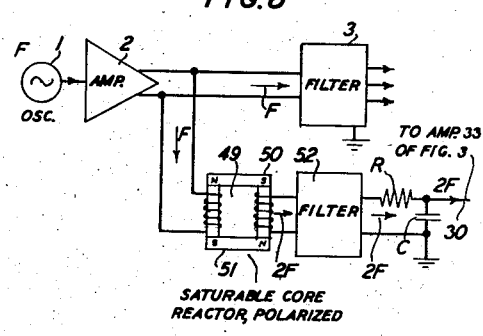
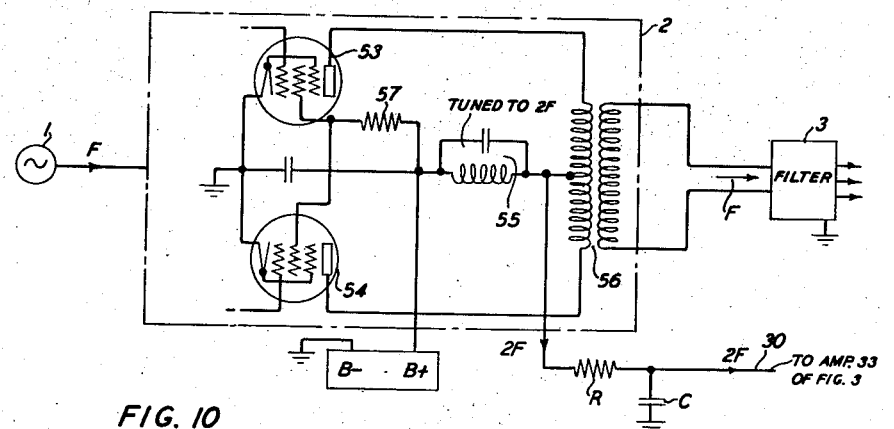
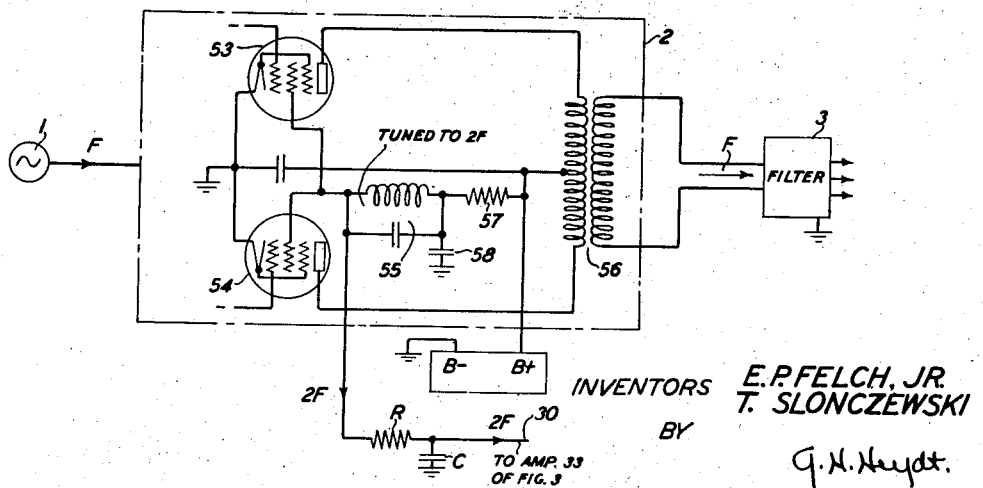
INVENTORS
E. P. FELCH, JR.
T. SLONCZEWSKI
BY
G. H. Heydt.
ATTORNEY Patented May 3, 1949

UNITED STATES PATENT OFFICE 2,468,968

MAGNETIC FIELD STRENGTH INDICATOR

Edwin P. Felch, Jr., Chatham, N. J., and Thaddeus Slonczewski, Glenwood Landing, N. Y., assignors to Bell Telephone Laboratories, Incorporated, New York, N. Y., a corporation of New York Application April 20, 1943, Serial No. 483,755

12 Claims. (Cl. 175—183)

This invention relates to the measurement of magnetic field strength and more particularly is it directed to the direct indication of the absolute strength of the magnetic field.

It is a well-known fact that the earth's magnetic field over any given limited area is substantially uniform except that this uniformity may suffer distortion in the presence of paramagnetic or diamagnetic material. This distortion usually results in a change in both the direction and absolute intensity of the field. In most cases the paramagnetic or diamagnetic body which produces the magnetic distortion is located at a considerable distance from the field strength measuring or indicating device and if the distorting material is to be detected, the measuring or indicating device must be highly sensitive and well compensated against extraneous influence.

In the copending application of T. Slonczewski, Serial No. 483,756, filed on even date herewith, there is described a system of three magnetometers each comprising a length of low retentivity magnetic material, preferably of high permeability and upon which one or more windings are wound. These three magnetometers are mounted with respect to one another so that their principal magnetic axes are mutually perpendicular. The magnetometer system described in the aforementioned copending application is theoretically independent of its orientation with respect to the direction of the magnetic field to be measured and for many practical applications is sufficiently free from response variations due to changes in the direction of the magnetic field. However, mechanical inaccuracies are bound to exist in every structure which are very difficult to entirely eliminate or compensate. For some applications extreme sensitivity is quite important and steps must be taken to eliminate or compensate for these structural inaccuracies.

It is the object of this invention to improve the sensitivity of a magnetic field strength measuring device of the type employing three magnetometers having their principal magnetic axes mutually perpendicular.

The foregoing object is achieved by this invention by providing in combination with a magnetometer system of the type described an orienting system capable of maintaining one of the mutually perpendicular magnetometers in substantial alignment with the magnetic field to be measured, said orienting system comprising in combination a circuit means associated with two of the magnetometers for deriving therefrom alternating current voltages proportional to the product of the field strength and the direction cosine of the angles formed by their principal axes and the direction of the magnetic field, a second voltage source of the same frequency as said derived voltages, two electromechanical driving means, one for each of said magnetometers from which said voltages are derived for mechanically driving said two magnetometers in response to the combined action of the derived voltages and the second voltage whereby said two magnetometers will have their principal magnetic axes maintained substantially perpendicular to the magnetic field to be measured and the third magnetometer is maintained in substantial alignment with said field.

This invention may be better understood by referring to the accompanying drawings, in which:

Fig. 1 schematically discloses three magnetometers with their principal axes mutually perpendicular and each forming an angle with the direction of the magnetic field;

Fig. 3 is a schematic diagram in block form disclosing the principal features of the invention;

Figure 5:
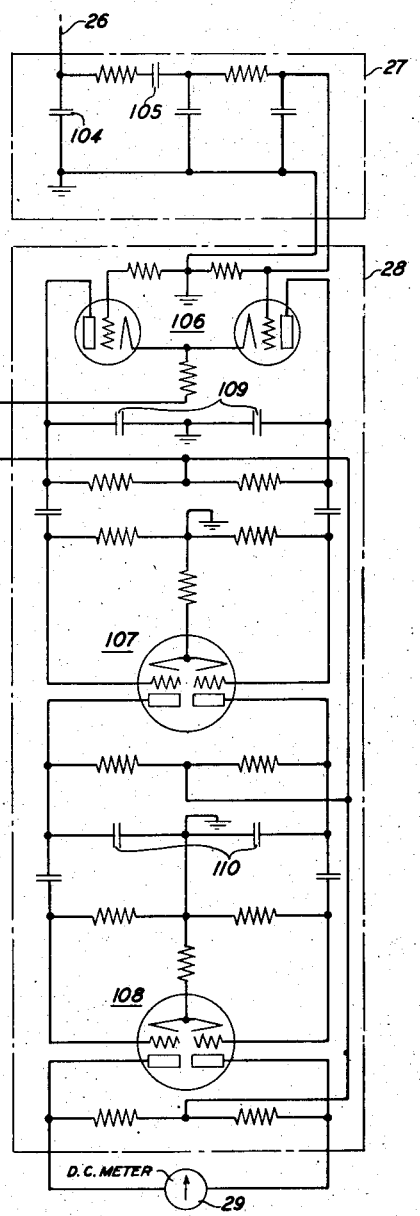
Figure 4:
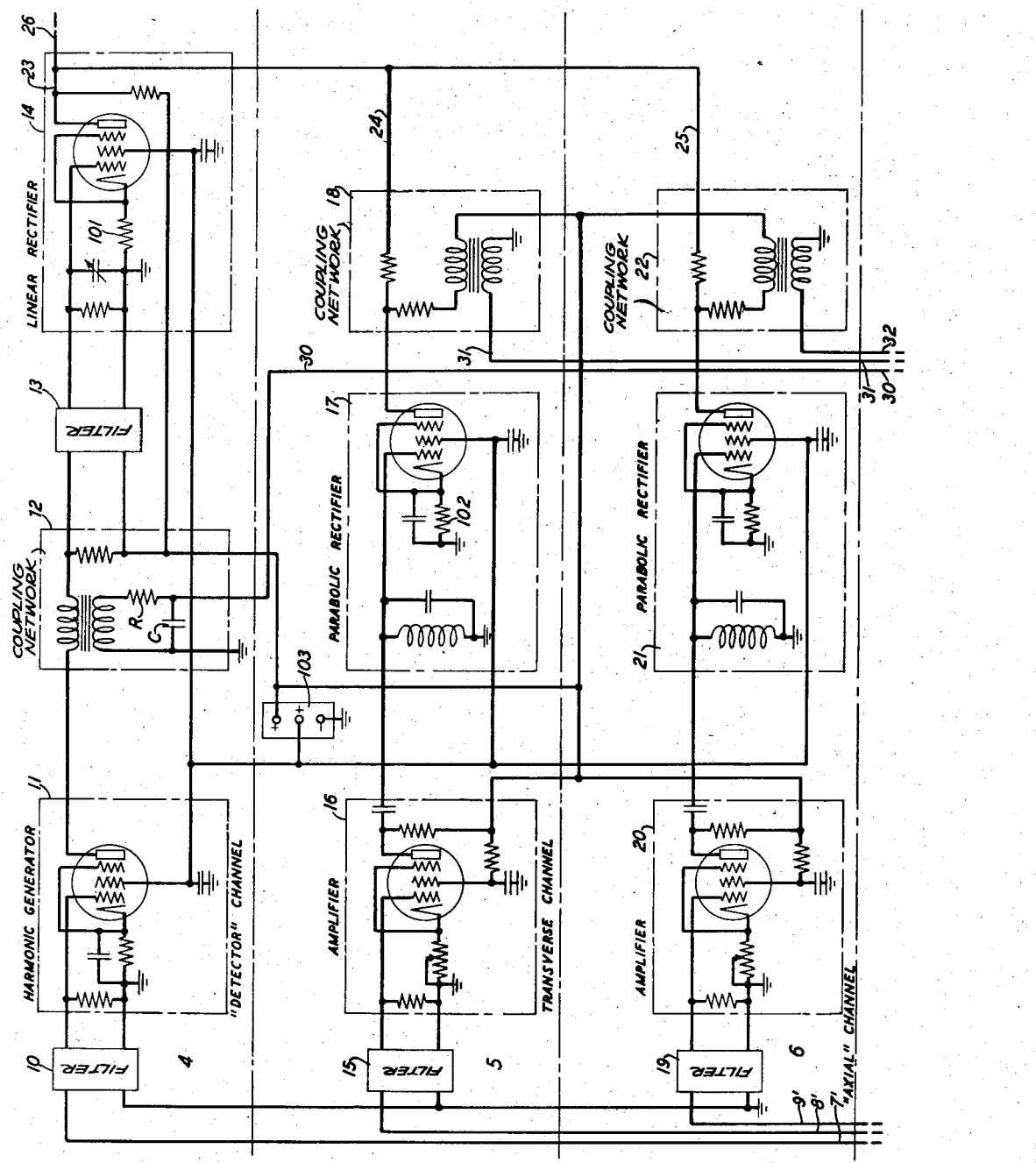
Figure 6:
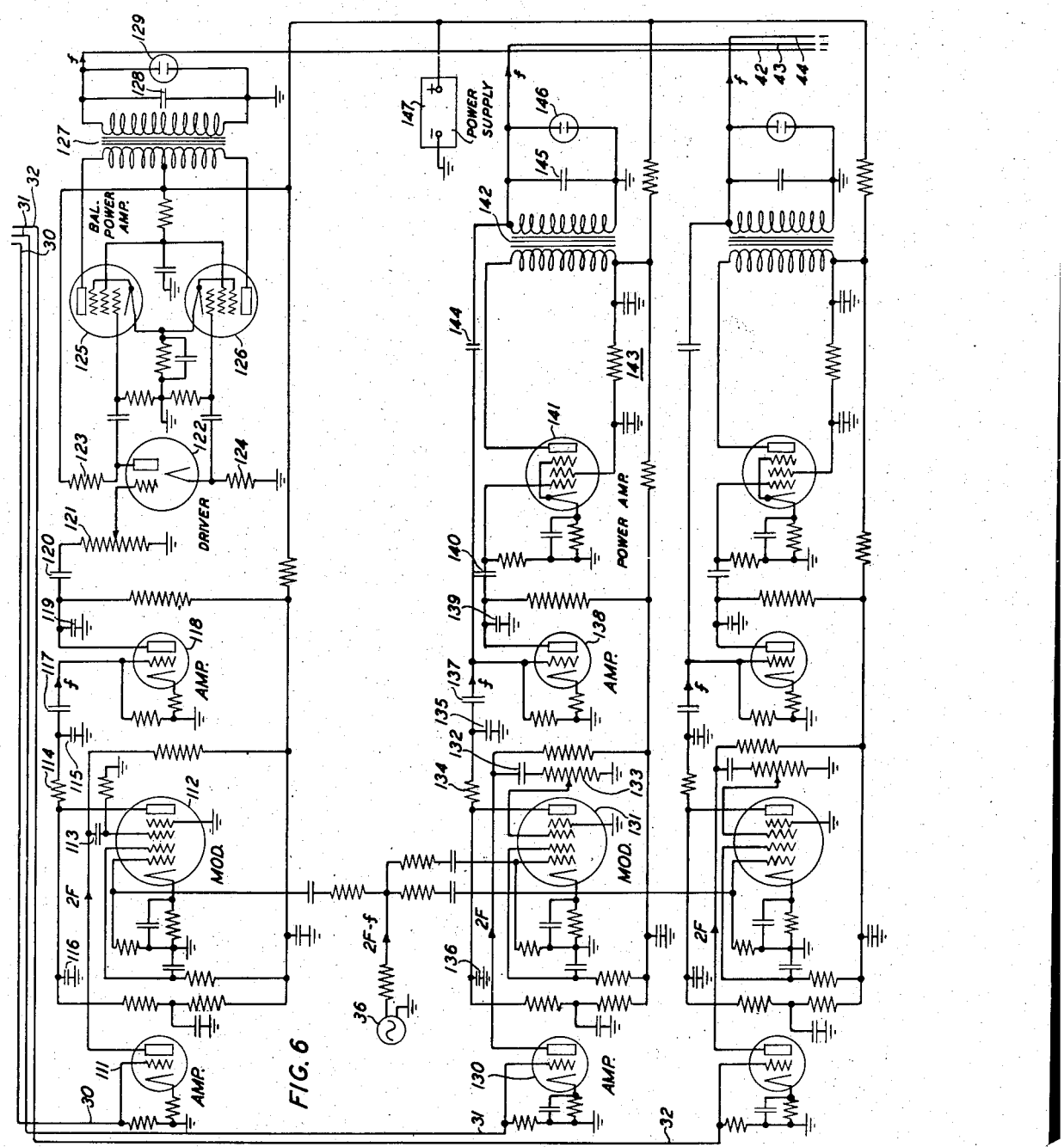

Fig. 4 discloses in more detail electrical circuits which are suitable for the detector channel 4, transverse channel 5 and axial channel 6 of Fig. 3;

Fig. 5 discloses in greater detail electrical circuits which are suitable for the filter, low frequency band amplifier and direct current meter circuit of Fig. 3;

Fig. 6 discloses detail circuits suitable for the oscillator-modulator-amplifier unit 41 of Fig. 3 which drives the orienting motors;

Figs. 7, 8, 9, and 10 show alternative means for obtaining one of the phase voltages for controlling the orienting motor drive of Fig. 3;

Fig. 11 shows one form of gimbal mechanism for supporting and driving the three magnetometer elements; and Fig. 12 shows an alternative form of magnetometer rotor per se for supporting the three magnetometers in mutually perpendicular relationship with a gimbal structure such as shown in Fig. 11.

Figure 1:
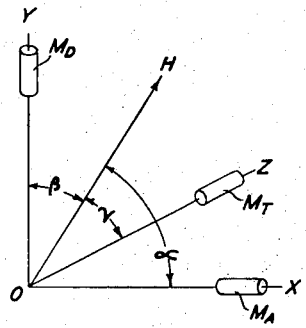

Referring now more particularly to Fig. 1 wherein are shown the three magnetometers with their principal axes mutually disposed perpendicular with each other. This magnetometer system is more completely described in the aforementioned copending application. However, for the purposes of this specification and for the sake of completeness, it should be noted that these magnetometers have their principal axes arranged mutually perpendicular along the X, Y and Z rectangular Cartesian coordinate axes. The magnetic field in which these magnetometers are placed is represented by a vector H passing through the origin O formed by the intersection of the three coordinate axes. The magnetic field vector H forms an angle $\alpha$, $\beta$, and $\gamma$ with the three axes X, Y and Z, respectively. To avoid confusion and for the sake of brevity, these three magnetometers are arbitrarily designated the detector magnetometer $M_D$ which coincides with the Y axis, the axial magnetometer $M_A$ which lies along the X axis and the transverse magnetometer $M_T$ which lies along the Z axis. Hereinafter these magnetometers will be referred to as the detector, axial and transverse magnetometers, respectively.

These magnetometers comprise essentially a core of low retentivity magnetic material preferably of high permeability and upon which one or more windings are wound. It has been discovered that when the magnetic field is at a right angle to the principal axis of the core and the winding be excited by a voltage of fundamental frequency, no even harmonics will be generated in the winding. On the contrary, if the angle is other than a right angle the magnetic field has a component in the direction of the principal axis of the core and if the winding is excited by a voltage of fundamental frequency, even order harmonic voltages will be generated therein, the magnitudes of which are proportional to the product of the field strength and the cosine of the angle formed by the principal axis of the magnetometer and the direction of the magnetic field. While any one of these harmonics can be used, the second harmonic is selected for illustrative purposes.

It can be shown mathematically that the sum of the squares of these three second harmonic voltages is entirely independent of the orientation of the three magnetometers with respect to the direction of the magnetic field providing the three magnetometers retain their mutually perpendicular relation and are equally sensitive. It can also be shown that the square root of the sum of the squares of these second harmonic voltages is proportional to the absolute strength of the magnetic field and likewise independent of the orientation of the magnetometer system with respect to the direction of the magnetic field. It is upon this fundamental principle that this invention is based. Practical systems of considerable sensitivity and relatively high precision can be achieved by carefully constructing the magnetometer units and carefully adjusting them in final assembly. Where a higher order of sensitivity and precision is required, the inaccuracies due to human inability to accurately assemble and maintain in perfect alignment three magnetometer units can be overcome by orienting and maintaining one of the magnetometers in substantial alignment with the field to be measured. By "substantial alignment" is meant to within a small angle of the order of about 5 degrees as it has been found that no observable errors appear within this range.

If the three second harmonic currents generated in the three magnetometers be separately squared and then added together, the total current may be expressed as follows:

$$I_1 = K^2 H^2 (\cos^2 \alpha + \cos^2 \beta + \cos^2 \gamma) = K_1 H^2 \quad (1)$$

where:

$I_1$ = the sum of the three squared magnetometer currents;
$K_1 = K^2$ = proportionality constant (K must be effectively the same for all three magnetometers);
$H$ = absolute magnitude of magnetic field vector.

The validity of Expression 1 is clearly evident from the geometry of Fig. 1 and would be theoretically perfect providing the principal magnetic axes of the three magnetometers always maintain the perfect mutual perpendicular relation.

Referring to Fig. 1, it will be noted that the axial and transverse magnetometers form angles $\alpha$ and $\gamma$, respectively, with the magnetic field vector H. In accordance with this invention each of these two angles is maintained substantially equal to 90 degrees so that their cosines are substantially equal to zero. Under these conditions substantially all of the current derived from the magnetometer system comes from the detector magnetometer $M_D$ and the angle $\beta$ formed by this magnetometer with the direction of the magnetic field is maintained very small.

Figure 2:
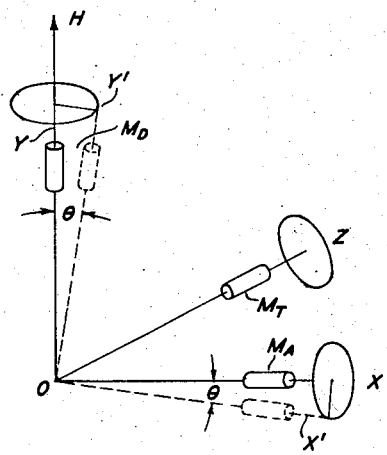
Fig. 2 shows the magnetometers of Fig. 1 with one of the magnetometers in substantial alignment with the magnetic field.

The operation of this invention may be further understood by referring to Fig. 2 in which the axial and detector magnetometers are shown shifted to an angle $\theta$ about the Z axis. Perfect alignment of these magnetometers would be achieved when the principal axis Y of the detector magnetometer $M_D$ coincides with the direction of the magnetic field vector H as shown. When this condition obtains, the principal axis of the axial magnetometer $M_A$ necessarily coincides with the X axis. When the axial and detector magnetometers are shifted through the angle $\theta$ as indicated by the dotted lines, the sum of the squares of the three magnetometer second harmonic currents would be still theoretically unchanged and independent of this shift in position. However, as just pointed out, it is desirable to shift the detector magnetometer back into substantial alignment with the magnetic field vector H. Under the conditions assumed the transverse magnetometer $M_T$ is normal to the magnetic field vector H and consequently has no second harmonic voltage induced in its winding. The axial magnetometer $M_A$, however, has its axis displaced to a position X' by reason of the displacement angle $\theta$. This results in the induction of a second harmonic voltage in the windings of the axial magnetometer. It is this voltage which is utilized in this invention for driving the axial magnetometer back to its original position coincident with the X axis and consequently the detector magnetometer $M_D$ is brought back in alignment with the magnetic field vector H. If the axial magnetometer had been shifted in the opposite direction about the Z axis, a second harmonic voltage of opposite phase would have been induced in the axial magnetometer windings to drive it back in the opposite direction to its original position. Similar consideration will show the same kind of control derived from the voltages generated in the transverse magnetometer $M_T$. It is clearly evident that this combined driving action will maintain the detector magnetometer $M_D$ always in substantial alignment with the magnetic field vector H.

Referring now to Fig. 3, a complete system in block form is shown for achieving the objective of the invention. In the lower portion of this figure, the three magnetometers are shown mutually disposed perpendicualr to one another in the same manner shown in Figs. 1 and 2. Each of these magnetometers is disclosed as having a single winding with one terminal of each brought to ground. A source of alternating current I of fundamental frequency F is used to excite each of these three windings with fundamental frequency. The output from alternating current source I is amplified by a suitable amplifier 2 and passed through a filter 3 capable of passing only the fundamental frequency F. The filter unit 3 is not shown in detail as any of the many well-known forms of filter units may be employed. It is only necessary to say that this filter unit 3 provides three separate filter channels for energizing through conductors 7, 8 and 9, the three magnetometer windings. The arrows in conductors 7, 8 and 9 denote the directions taken by the currents of fundamental and second harmonic frequency, the latter being generated in the magnetometer windings.

Since filter unit 3 will pass only voltages of fundamental frequency, the second harmonic voltages generated by the three magnetometers will not pass through this filter unit but will instead be carried on to three channels 4, 5 and 6 denoting the detector channel, transverse channel and axial channel, respectively. The meaning of these terms with respect to the magnetometers is obvious. An important advantage in the use of the filter unit 3 is that it prevents the transmission of second harmonic voltages from one of the magnetometer channels to another.

In each of the channels 4, 5 and 6 there is disclosed a second harmonic filter 10, 15 and 19, respectively. The second harmonic voltage coming from the detector magnetometer, for example, passes through conductor 7, is rejected by filter 3 and continues on by way of conductor 7' to filter 10 in the detector channel. Likewise the second harmonic voltage generated by the transverse magnetometer is carried by way of conductors 8 and 8' to filter 15 and the voltage from the axial magnetometer is carried by conductors 9 and 9' to filter 19 in the axial channel. These three filters reject all voltages of fundamental frequency and pass only those of second harmonic frequency. So far these three channels 4, 5 and 6 are identical and it is possible to keep them so throughout. However, certain advantages may be derived by making them different as will hereinafter be made clearer.

In the detector channel 4 the second harmonic voltage leaving filter 10 is passed through the input circuit of a harmonic generator 11. This generator is preferably of one stage, although it may have a plurality of stages as is well known. The output of this harmonic generator contains the second and fourth harmonics as symbolically indicated by the characters 2F and 4F adjacent the output circuit. A coupling unit 12 comprising a transformer with primary and secondary windings, a resistor R and capacitor C couples the output of the harmonic generator to a fourth harmonic filter 13 as well as to the orienting motor drive unit 41 by way of conductor 30. The constants of this coupling unit are so proportioned as to permit a ready passage of a fourth harmonic current through the primary winding and substantially rejecting voltages of this frequency in the secondary winding. Filter 13 will pass only the voltages of fourth harmonic frequency and hence the second harmonic voltage from the harmonic generator 11 passes through the transformer coupling to the secondary winding of the transformer which readily transmits voltages of this frequency.

Resistor R and capacitor C of the coupling network 12 are so proportioned as to shift the phase of the second harmonic voltage 2F by substantially 90 degrees with respect to the second harmonic voltages generated in the magnetometer windings. The purpose of this phase shift is to provide a two-phase voltage for driving motors 37 and 38 as will be hereinafter more clearly described.

The voltage of fourth harmonic frequency 4F coming from filter 13 is passed into the input circuit of a linear rectifier 14. This rectifier may be of any well-known form and provides a rectified direct current in its output circuit substantially proportional to the magnitude of its input voltage. This direct current is represented as $I_D$ which is the rectified direct current from the detector channel and leaves the linear rectifier output circuit by way of conductor 23.

The transverse and axial channels are identical in structure. The outputs of the second harmonic filters 15 and 19 in these two channels are applied to the input circuits of amplifiers 16 and 20, respectively. It should be remembered that the output voltage from the detector magnetometer $M_D$ is relatively large compared with the output voltages from the transverse and axial magnetometers $M_T$ and $M_A$, respectively. For this reason it is possible to operate directly a harmonic generator 11 in the detector channel without the need of previous amplification. Of course it is obvious that amplification could be used if desired. However, in connection with the transverse and axial channels, these second harmonic voltages are relatively feeble and ordinarily require amplification. This is provided by the two amplifiers 16 and 20, the outputs of which are fed into the input circuits of parabolic rectifiers 17 and 21, respectively.

A well-known property of a harmonic generator is that the amplitude of its second harmonic voltage is proportional to the square of the amplitude of its fundamental frequency input voltage. Consequently in the detector channel, the amplitude of the fourth harmonic frequency voltage from harmonic generator 11 is proportional to the square of its input second harmonic frequency voltage. In this connection it must be kept in mind that the harmonic orders referred to in the preceding sentence are with respect to the frequency F of source 1. This is the means employed in the detector channel for producing a voltage proportional to the square of the second harmonic voltage generated in the detector magnetometer.

In the transverse and axial channels, squaring is achieved in the parabolic rectifiers 17 and 21. It is a well-known property of these rectifiers that their rectified output currents will be proportional to the square of the input voltages and in the transverse and axial channels; these currents are denoted $I_T$ and $I_A$, respectively. To each of these rectified currents is added the second harmonic frequency component 2F which is always superimposed on the rectified current of these rectifiers. These currents are passed into coupling networks 18 and 22. The rectified currents $I_T$ and $I_A$ are passed through resistors in these two networks and into an output circuit by way of conductors 24 and 25, respectively. The voltages of second harmonic frequency are passed through the primary windings of the transformers in coupling units 18 and 22 by way of resistors through obvious circuits. The secondary winding of each of these transformers has one terminal grounded and the other terminal connected by way of conductors 31 and 32, respectively, to the orienting motor drive unit 41. These secondary windings, therefore, transmit the voltages of second harmonic frequency from the transverse and axial channels to the orienting unit 41.

From the description just preceding, it is evident that the rectified currents $I_D$ of the detector channel, $I_T$ of the transverse channel and $I_A$ from the axial channel are each proportional to the square of the output second harmonic voltages coming from the three magnetometer units $M_D$, $M_T$ and $M_A$ and their sum is collected through conductor 26 by reason of the juncture of this conductor with connectors 23, 24 and 25 of the three channels into a total current which is proportional to the sum of the squares of these three second harmonic voltages.

A filter 27 may be designed to transmit either only direct current or only direct current variations which take place at a rate within a predetermined range. In either event the output of this filter is fed through a low frequency band amplifier 28 or in the alternative a direct current amplifier and impressed on a direct current meter 29. It is evident that if filter 27 and amplifier 28 will each pass direct current, that meter 29 will indicate a current proportional to the sum of the squares of the three second harmonic output voltages from the three magnetometers and consequently proportional to the square of the strength of the magnetic field vector H. If direct current meter 29 is calibrated to read the square root of its input voltage, then it can be made to read directly the strength of the magnetic field vector H.

Filter 27 and amplifier 28 may be adapted to pass variations in direct current within a predetermined frequency range, that is to say, the circuit constants thereof may be so proportioned as to preclude the transmission of very slow changes of direct current as well as relatively rapid ones but permit the transmission only of direct current variations between predetermined minimum and maximum values. In this event meter 29 will be caused to indicate variations in the magnitude of the field strength vector H which occur at a rate within a predetermined range. This latter circuit arrangement is particularly applicable where the system is to be mounted in an airplane and used for detecting submarine or subterranean magnetic anomalies.

The fundamental frequency F from alternating current source 1 is preferably of the order of one or two kilocycles per second, although it may be either higher or lower without departing from the invention. If the voltage of fundamental frequency is of the order of one kilocycle per second, then the second harmonic coming from conductors 30, 31 and 32 into the orienting drive unit 41 will be of the order of 2,000 cycles per second which is too high for operating ordinary power machinery such as motors 37 and 38. In order to drive these motors the frequency of these voltages is reduced to a frequency $f$ as shown adjacent the arrows in conductors 42, 43 and 44 and which may, for example, be 60 cycles per second. This is achieved by means of combined modulators and amplifiers 33, 34 and 35 which are provided with an input voltage from alternating current source 36 of frequency equal to $2F-f$. The second harmonic voltages coming from the detector, transverse and axial channels by way of conductors 30, 31 and 32 are combined with the voltage output from alternating current source 36 in the modulator section of combined modulator-amplifiers 33, 34 and 35 to produce the required voltage for driving the motors 37 and 38.

It is to be remembered that the voltage supplied by conductor 30 from the detector channel is shifted in phase by 90 degrees by reason of resistor R and capacitor C in the coupling unit 12. This voltage is supplied to the input terminals of modulator-amplifier 33 and the output difference frequency voltage is applied to one pair of windings in motors 37 and 38 by way of conductor 42. The other phase windings in these two motors are individually supplied by way of conductors 43 and 44 from their respective combined modulators and amplifiers 34 and 35, respectively.

The operation of the system as described above is as follows: The three magnetometers are each excited with voltages of fundamental frequency from alternating current source 1. The second harmonic voltages induced therein are transmitted to their respective channels 4, 5 or 6 wherein their amplitudes are squared and rectified outputs are delivered proportional to the squares of the respective second harmonic voltages. These rectified components are added together through conductor 26 and applied to an indicating instrument which indicates the magnitude of the magnetic field in which the magnetometers are immersed. Voltages of second harmonic frequency are derived from each of the three channels 4, 5 and 6 by way of conductors 30, 31 and 32. These second harmonic voltages are converted in frequency by the oscillator-modulator-amplifier arrangement 41. The second harmonic voltage from the detector channel after being converted in frequency is applied to one phase winding of each of motors 37 and 38 by way of conductor 42 and is displaced in phase 90 degrees with respect to the converted voltages coming from amplifiers 34 and 35 by way of conductors 43 and 44. If the detector magnetometer $M_D$ is in exact alignment with the magnetic field H, it necessarily follows that both the transverse and axial magnetometers $M_T$ and $M_A$ are substantially perpendicular to the direction of the magnetic field vector H and consequently have induced therein no second harmonic voltages. Under this assumed condition there are no second harmonic voltages applied by way of conductors 31 and 32 to amplifiers 34 and 35 so that both motors 37 and 38 are fed only with the single phase voltage from amplifier 33 and consequently do not rotate in either direction.

On the other hand, should either the transverse magnetometer $M_T$ or the axial magnetometer $M_A$ form an angle other than 90 degrees with the direction of the magnetic field, there will be induced therein a second harmonic voltage of magnitude and phase depending upon the magnitude and direction of angular displacement. Displacement of the transverse magnetometer will cause motor 37 to rotate in one direction or the other to correct the displacement as the shaft of the motor 37 is effectively coupled to the transverse magnetometer through a mechanical linkage 39. Also any displacement of the axial magnetometer will cause motor 38 to rotate in the proper direction to cause a correction, the shaft of this motor being effectively coupled to the axial magnetometer through a mechanical linkage 40. The mechanical structure for these linkages may take most any well-known form of gimbal mechanism and one such form is illustrated in Fig. 11. Another gimbal mechanism capable of two degrees of rotational freedom to provide the same functions is illustrated by the disclosure of United States Patent 2,027,393 to H. J. McCreary issued January 14, 1936.

Referring now more particularly to Fig. 11 it will be noted that the three magnetometers are mounted with their axes in mutual perpendicular relationship as is shown in Fig. 3, that motor 37 may, through a belt means 39 and pulley 39', rotate the transverse magnetometer $M_T$ about a mechanical axis normal to its principal magnetic axis and that motor 38 may, through a gear means 40, rotate the axial magnetometer $M_A$ about a mechanical axis normal to its principal magnetic axis. It is thus evident that the axial and transverse magnetometers are rotated by their respective motors about mutually perpendicular mechanical axes and that the detector magnetometer $M_D$ will be thus oriented into alignment with the direction of the field vector H in the manner previously described. In Fig. 11 the electrical windings and connections shown in Fig. 3 have been deleted for clarity. If smaller angular corrections only are required the connections may be made through flexible cables but if large angular rotations are necessary the connections must be taken through conventional slip rings which are well known in the art and commonly used for this purpose.

Fig. 12 shows an alternative form of rotor mount for the magnetometers and is similar to a mount disclosed in the aforementioned copending application of T. Slonczewski. The only real difference between this figure and Fig. 11 is that the three magnetometers are each displaced with respect to the axis of rotation of the rotor or, stated otherwise, the mechanical axis is not coaxial with the magnetic axis of the axial magnetometer and does not intersect any magnetic axis. The magnetometers, however, still have their magnetic axes mutually perpendicular so that the magnetic action is obviously identical to that already described. In this connection it may also be observed that any one of the magnetometers may be positioned anywhere else about the support or anywhere within it providing its principal magnetic axis is kept normal to each of the planes in which the other two lie thereby retaining the mutually perpendicular relationship previously described as essential to the successful operation of the system. They are herein disclosed positioned on the three conventional Cartesian coordinate axes merely to simplify the description.

Fig. 4 shows in more detail the harmonic generator, amplifier and rectifier circuit for the detector, transverse and axial channels 4, 5 and 6 of Fig. 3. For example, the detector channel 4 of Fig. 4 comprises the filter 10, harmonic generator 11, coupling network 12, filter 13 and linear rectifier 14, all of which are shown schematically in the same order in Fig. 3. The harmonic generator 11 may be of any of the well-known types and the circuits specifically shown in Fig. 4 are illustrative of those which may be used in connection with a pentode. The circuit constants are so chosen as to cause the second harmonic input voltage coming from filter 10 to generate and transmit the fourth harmonic to the output circuit. A more detailed explanation of the theory and method whereby such harmonics are generated may be found in the first edition of The Thermionic Vacuum Tube and Its Application, by H. J. Van der Bijl, page 168. It will be remembered from the previous discussion that the output of this harmonic generator will contain a second harmonic component, the amplitude of which is equal to the square of the amplitude of its input fundamental frequency. Since the input fundamental frequency is actually the second harmonic of the frequency of the alternating current supply 1 of Fig. 3, this output harmonic is referred to as the fourth harmonic. This fourth harmonic output voltage is carried through the primary of the transformer in coupling network 12 and passed by the filter 13 into the linear rectifier 14. Here again the circuit may be of any well-known form. However, the principal requirement for the circuit in the form shown is that the cathode resistor 101 should be relatively high, for example, in the order of 100,000 ohms. The remaining circuits are quite conventional for pentode tubes. It is to be remembered that the direct current output of this linear rectifier is proportional to the square of the second harmonic delivered from the detector magnetometer by reason of the fact that the amplitude of the input voltage to the linear rectifier 14 was squared by the action of the harmonic generator 11.

In addition to the fourth harmonic output from the harmonic generator 11 it also amplifies and delivers into its output circuit some of the input second harmonic voltage applied to its control grid. As previously stated, this second harmonic voltage is readily passed through the transformer in network 12, is shifted in phase by reason of the phase shifting network comprising resistor R and capacitor C and carried to the orienting drive circuit of Fig. 3 by way of conductor 30.

In the transverse channel 5 of Fig. 4 there is shown the filter 15, amplifier 16, parabolic rectifier 17 and coupling network 18. Amplifier 16 may be of any conventional form, the circuits herein specifically disclosed being only suggestive. The cathode resistor is made variable to adjust the amplifier gain so that the effective sensitivity of the transverse channel may be made the same as the detector channel sensitivity. This makes the constant K of Equation 1 the same for these channels. It is to be remembered that due to the orienting function of the orienting system of this invention the transverse and axial magnetometers have their principal axes normally at right angles with the direction of the magnetic field. Consequently, the second harmonic generated in either the transverse or axial magnetometer due to slight variations from the right angle relationship is relatively feeble and therefore amplifiers 16 and 20 are advisable. The output of amplifier 16 is still of second harmonic frequency and is applied to the input circuit of a parabolic rectifier 17. The theory of square law or parabolic rectification is well known and for further theoretical discussion reference may be made to the Electrical Engineers Handbook, third edition, volume 5, by Pender-McIlwain, section 7, page 115. Briefly, however, it may be stated that the cathode resistor 102 is of such magnitude as to produce a bias voltage on the control grid sufficient to bring the output plate current into the lower curved portion of its characteristic. The relative magnitudes of all the circuit parameters are so adjusted that a portion of the characteristic curve is selected to produce an output direct current component proportional to the square of the input alternating current voltage. The output of this parabolic rectifier 17 is carried into the coupling network 18 through which the direct current component is carried to conductor 24. The parabolic rectifier 17 also delivers some second harmonic output, that is, an output of frequency equal to the second harmonic of the frequency of source 1. This output is carried through the transformer of network 18 and delivered to the orienting circuit 41 of Fig. 3 by way of conductor 31.

The circuits of the axial channel 6 are identical with those just described for the transverse channel 6. The direct current supply for all of the tubes in Fig. 4 is from source 103. This source provides suitable screen grid and plate voltages through obvious circuits.

The circuits of the filter 27 and low frequency band amplifier 28 of Fig. 3 are shown in greater detail in Fig. 5. For the purpose of showing one complete embodiment of the invention it will be noted that the circuits of filter 27 are in the form of a low frequency band filter. Referring for the moment again to Fig. 4 it will be noted that the output circuits of the linear rectifier 14 and parabolic rectifiers 17 and 21 do not provide for segregation of the plate supply voltage from the direct current output to conductor 26. This is because the circuits shown in Fig. 4 are specially designed for efficiently showing variations in the rectified output which take place at a rate within a predetermined range. Proper segregation, however, is achieved by the filter network 27 of Fig. 5 by reason of the inclusion of condensers 104 and 105. It will be obvious from the configuration of filter 27 that steady direct current voltages applied to conductor 26 are blocked from transmission by condenser 105, while variations in a direct current voltage applied to conductor 26 will be transmitted through the filter. It will also be obvious that by a proper selection of resistances and capacities for this filter network a very large attenuation will be provided for rapid changes in the direct current supplied to conductor 26. Consequently, within a predetermined range determined by the circuit constants of filter 27 direct current voltage variations applied to conductor 26 will be transmitted through filter 27 to the phase inverter network 106 of the low frequency band amplifier 28.

The output of phase inverter 106 is applied to the input circuit of a two-stage balanced amplifier comprising stages 107 and 108. The coupling between the phase inverter and these two stages is by the well-known resistance capacity coupling. In addition to this usual coupling, however, filter condensers 109 and 110 are also applied across the output circuits of the phase inverter 106 and across the output circuits of the first stage 107 of the two-stage amplifier. These condensers are relatively large and may be of the order of 4 microfarads. These filter condensers aid in the suppression of any harmonics and permit the transmission only of low frequency direct current variations. It may be stated that they are in the nature of an added precaution to insure that only the low frequency direct current variations will be transmitted to the meter 29 which is connected to the output circuit of the last stage 108 of the two-stage amplifier. With the circuit shown in Fig. 5, it will be apparent that the direct current meter 29 will indicate not only the magnitude of the direct current variation but also its direction and for this purpose for the specific circuit shown it is preferable that meter 29 be of the zero center type.

In Fig. 3 the orienting amplifiers and modulators were shown in block form within rectangle 41. One form of circuit arrangement capable of producing the function schematically represented in Fig. 3 is shown in Fig. 6. While these circuits may be described in some detail they should nevertheless be regarded as illustrative only as many other amplifier and modulator circuit arrangements are well known in the art and may be substituted for those herein specifically described. Referring again to Fig. 3 it will be noted that the second harmonic output of the detector transverse and axial channels are carried to the orienting amplifier and modulator 41 by way of conductors 30, 31 and 32, respectively. These conductors are also shown coming from the more detailed circuit diagram for the detector transverse and axial channels shown in Fig. 4. In Fig. 6 these three conductors 30, 31 and 32 are shown coming down from the upper part of the diagram and applied to the input circuit of each of three amplifiers. For example, conductor 30 is connected to the input circuit of amplifier 111. It should be remembered that the function of this combined amplifier and modulator is to change the frequency of the second harmonic down to a lower frequency, for example, 60 cycles per second for operating the orienting motors 37 and 38 shown in Fig. 3. This is accomplished in Fig. 6 by means of modulating the voltage of second harmonic frequency 2F with a voltage of frequency $2F-f$. This latter frequency is provided by oscillator 36 shown both in the rectangle 41 of Fig. 3 as well as in Fig. 6. These two voltages are combined in modulator 112 by carrying the voltage of second harmonic frequency 2F to one of the control grids of modulator 112 through coupling condenser 113 and carrying the other voltage from oscillator 36 to another control grid of modulator 112 through an obvious circuit. The operation of these electron coupled modulators is well known in the art and requires no further description.

The voltage of difference frequency $f$ is carried from the plate of modulator 112 through resistor 114, coupling capacitor 117 to the grid circuit of amplifier 118. Condensers 115 and 116 act as filters to prevent the transmission of the higher frequency components and permit the passage only of the lower difference frequency $f$. The output of amplifier 118 is carried through capacitor 120 to potentiometer 121 from which it is applied to the control grid of a driver tube 122. Plate resistor 123 and cathode resistor 124 of driver tube 122 are of equal magnitude so that the plate and cathode voltages will shift with respect to ground by the same amount but of opposite sense due to variations in voltage on the driver control grid. These voltage variations are transmitted through a conventional resistance capacitor network to the control grids of the balanced power amplifier tubes 125 and 126. The output of these tubes is transformer coupled through transformer 127 to motor lead 42 which is connected to one of the phase windings of each of the motors 37 and 38 as shown in Fig. 3. In the secondary circuit of transformer 127 will be found a filter condenser 128 to prevent the transmission of any second harmonic voltages. Also in the secondary circuit is a neon tube 129 which provides a convenient means of indicating the presence of a second harmonic voltage in the detector magnetometer $M_D$. This neon tube, together with similar tubes in the transverse and axial magnetometer channels, furnishes assurance that the circuits are functioning properly.

It is to be remembered that by reason of the orientation of the three magnetometers so that the detector magnetometer is kept in substantial alignment with the magnetic field while the transverse and axial magnetometers are each kept with their principal axes substantially perpendicular to the direction of the magnetic field, substantially all of the output from the three magnetometers is derived from the detector magnetometer while the transverse and axial magnetometers deliver only a very small amount of the energy or none at all. For this reason the power amplifier stage of the modulator-amplifier network just described is designed for delivering a great deal more power than the modulator-amplifier networks for the transverse and axial magnetometers. The power amplifier stage in the network just described comprises two tubes 125 and 126 connected in push-pull relationship. The power amplifier stage for the transverse magnetometer comprises tube 141 as shown in Fig. 6.

The modulator and amplifier networks for the transverse and axial magnetometers are identical and a description of the transverse magnetometer network will apply to the axial magnetometer network with equal force. The second harmonic output derived from network 18 of Fig. 3 is transmitted from the transverse magnetometer channel by way of conductor 31 to the amplifier-modulator network 41. In Fig. 6 conductor 31 is shown coming from the upper part of the diagram around to the left and into the input circuits of amplifier 130. After amplification this second harmonic voltage of frequency 2F is applied to potentiometer 133 through coupling condenser 132. The slider of potentiometer 133 is connected to one of the control grids of modulator tube 131. The output of oscillator 36 is connected to another control grid of modulator 131 in the same manner as it was connected in the detector channel. The functions of amplifier 130 and modulator 131 as well as those of condensers 135, 136, 137 and resistor 134 are the same as for corresponding parts just described in connection with amplifier 111 and modulator 112. The result is that a voltage of difference frequency $f$ is transmitted to the control grid of an amplifier 138 which corresponds with amplifier 118. The output of this amplifier is fed directly to the power amplifier 141 through coupling condenser 140. A capacitor 139 is connected to the output circuit of amplifier 138 to filter any higher harmonics which may attempt to pass into the power amplifier 141. The output of power amplifier 141 is transformer coupled through transformer 142 to the output lead 43 which is connected to the transverse orienting motor 37 as shown in Fig. 3. Condenser 145 and neon tube 146 perform the same function as the corresponding parts 128 and 129 of the detector channel previously described. The two-stage amplifier comprising tubes 138 and 141 are provided with some feedback through a feedback condenser 144 connected to the upper end of the secondary of transformer 142 back to the control grid of amplifier 138. This circuit also provides a path for the feedback of the counter-electromotive force from the motor to increase the motor drive stability and preclude hunting. The screen grid of power amplifier 141 is supplied with a suitable positive voltage through filter network 143 from the power supply 147. In this connection it may be stated that the screen and suppressor grids in not only the power amplifier tube 141 but also the modulator tubes 112 and 131 and the power amplifier tubes 125 and 126 are connected in conventional manner and require no detailed description.

The second harmonic output from the axial channel 6 of Fig. 3 is transmitted by way of conductor 32 to the corresponding amplifier-modulator network shown in Fig. 6 which is identical with those just described for the transverse channel. The output from this network is transmitted by way of conductor 44 shown in both Figs. 6 and 3 to the axial orienting motor 38 shown in Fig. 3.

In Fig. 6 power supply 147 supplies all of the energy for all of the electrodes in all of the tubes shown. The power supply for the plates and the various bias potentials for the grids are clearly shown and while detailed circuits are not shown for the cathode heaters these circuits are entirely conventional and the energy may be taken from source 147 as is well known. This statement also applies to the vacuum tube circuits of all of the previously described circuits.

It is to be remembered in connection with Figs. 3 and 4 that the voltage of second harmonic frequency is derived from the detector channel 4 and transmitted by way of conductor 30 to the modulator-amplifier network 41 to be applied to one of the phase windings of each of motors 37 and 38 by way of conductor 42. It is also to be remembered that this voltage is shifted in phase by reason of the resistance capacity network R, C of the coupling network 12 in the detector channel 4. While this is a convenient method of obtaining this second harmonic voltage, it is clearly obvious to all those skilled in this art that it is not essential that the voltage be derived from the detector channel. In fact it may be derived directly from source 1 instead of from the detector channel and the harmonic generator 11 of the detector channel 4 may be coupled directly to the filter 13, thereby eliminating the coupling network 12.

By way of showing specific examples of other means of obtaining this second harmonic voltage properly shifted in phase for operating motors 37 and 38, reference may be made to Figs. 7, 8, 9 and 10. In Fig. 7, for example, the voltage of fundamental frequency F coming from source 1, amplified by amplifier 2 and transmitted to filter 3 may also be transmitted to a transformer 45 as shown. The secondary circuit of transformer 45 may be applied to a pair of diodes connected in balanced relation. These diodes 46 and 47 have connected in their common leg a network 48 tuned to the second harmonic frequency. It is well known that diode circuits of this type will generate a number of harmonics including the second harmonic. One side of the tuned network 48, for example the side connected to the cathode, may be connected to ground while the other side may be connected through the phase shifting network comprising resistor R and capacitor C to conductor 30 which is connected to amplifier 33 of Fig. 3. The function of resistor R and capacitor C is identical with that previously described for coupling network 12 in Fig. 3 and the operation will be obvious from the description previously given.

In Fig. 8 the output of fundamental frequency F is again taken from the output of amplifier 2 and applied to a saturable core reactor 49. This reactor is polarized by means of permanent magnets 50 and 51. It is well known that a structure of this type which contains an unsymmetrical magnetic field will develop a series of harmonics including the second harmonic 2F. This second harmonic voltage may be taken from the reactor through a secondary winding which is connected to filter 52 adapted to pass only the second harmonic. The output of this filter is transmitted to conductor 30 through the phase shifting network resistor R and capacitor C. Conductor 30 is connected to amplifier 33 of Fig. 3 as previously described and the operation is obvious in the light of the previous description.

In Fig 9 a second harmonic is generated in the last stage of amplifier 2 and the pertinent portion of the network is shown in sufficient detail to illustrate the invention. It is well known that power stages may easily be caused to generate harmonics and that a voltage of second harmonic frequency is easily developed in the common leg of a balanced amplifier. Actually the second harmonic may be derived either from the screen grid electrode or from the anode circuit. In Fig. 9 the second harmonic is generated in the common leg of the anode circuit. The two amplifier tubes 53 and 54 are shown in the form of pentodes the screen grids of which are provided with suitable positive bias through resistor 57. The plates are provided with direct current through the coil of network 55 and the primary of transformer 56. Network 55 is tuned to the second harmonic frequency 2F. The left-hand side of this network is capacity coupled to ground through an obvious circuit while the right-hand end of this circuit is connected to the phase shifting network R, C and finally to conductor 30 and to amplifier 33 of Fig. 3 as previously described. From the previous description the operation of this circuit is clearly evident to all skilled in the art.

The operation of Fig. 10 is essentially identical to that described for Fig. 9. In this case, however, the tuned network is connected in the screen grid circuit rather than in the anode circuit. In this case the right-hand end of the tuned network 55 is capacity coupled to ground through condenser 58, while the left-hand end of the tuned network 55 is connected to the phase shifting network comprising resistor R and capacitor C as before. This second harmonic voltage after being shifted in phase is transmitted to amplifier 33 of Fig. 3 by way of conductor 30 as previously described. In all of these Figs. 7 to 10, inclusive, a source of fundamental frequency voltage 1, amplifier 2 and filter 3 correspond with the source 1, amplifier 2 and filter 3 of Fig. 3.

It may be noted that for the system shown in Fig. 3 wherein the common phase voltage for the two motors 37 and 38 is derived from coupling network 12 in the detector channel 4, a possible ambiguity may exist in that the orienting system is unable to distinguish between having the detector magnetometer directly in line with the magnetic field or 180 degrees from the initial alignment position. That is to say, the system will operate in such a manner that should the angle $\theta$ as indicated in Fig. 2 be less than 90 degrees the detector magnetometer will be brought back to its original position. However, should the angle $\theta$ become greater than 90 degrees the phases of the voltages in both the detector and the transverse channels will reverse and cause the orienting motors to drive the detector magnetometer into alignment with the field but 180 degrees from its original position. While this condition should theroretically produce no difficulty, as a practical matter it is undesirable when making absolute measurements in the magnetic field strength since perfect electrical and mechanical symmetry is impossible of achievement. This difficulty is easily obviated by providing the phase voltage common to the two motors 37 and 38 from a separate circuit associated with source 1 instead of taking it from the detector channel as indicated in Fig. 3. For this purpose any of the arrangements shown in Figs. 7, 8, 9 and 10 or their equivalents may be used. When this is done it is evident that the phase of the voltage common to the windings in motors 37 and 38 will not shift irrespective of the position taken by the magnetometer. Under this condition it is immaterial what position the magnetometers take in the magnetic field. The detector magnetometer will always be brought back to the same initial position. For example, referring again to Fig. 1 where the axial magnetometer is shown at an angle $\alpha$ from the direction of the field, it is clear that since the second harmonic voltage generated in this magnetometer is proportional to the cosine of the angle $\alpha$ between its principal axis and the direction of the magnetic field that the cosine will be negative for all angles between 90 degrees and 270 degrees and positive for all angles between +90 degrees and —90 degrees. A theoretical dead center will exist only when the angle $\theta$ of Fig. 2 is exactly 180 degrees (when the angle $\alpha$ of Fig. 1 is 270 degrees). This, however, is of no practical significance since a very slight movement of the magnetometer system will produce a small second harmonic voltage of one phase or the other and immediately cause rotation to the original normal position which for the axial magnetometer is 90 degrees with respect to the direction of the magnetic field. It is therefore evident that to derive the phase voltage common to the two motors from a means other than the detector channel is of considerable advantage for high precision measurements and very sensitive detection.

While some rather specific and detailed circuits have been shown for some of the elements of the broad combination disclosed in Fig. 3, it is clearly evident to those skilled in the art that many variations of the specific circuits described may be employed to achieve the same results. It is also to be understood that this invention is not limited to these specific circuits but that it includes any reasonable equivalents which may be substituted for the various component parts shown in the broad combination in Fig. 3. Also, while the second harmonic generated in the magnetometers has been utilized in the specific embodiment herein disclosed it is obvious that any one of the other even order harmonics could be used. The second harmonic is preferred because it simplifies the filter problem since the higher order harmonics are increasingly more difficult to separate.

What is claimed is:

1. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate a voltage of second harmonic frequency therein proportional to the product of the field strength and the direction cosine of the angle formed by the principal magnetic axis of each magnetometer with the direction of the magnetic field to be measured, an electromechanical orienting system therefor comprising two reversible electric motors one for each of two of said magnetometers, a mechanical linkage from each of said motors to its associated magnetometer whereby the motors may rotate their associated magnetometers around mutually perpendicular axes, an electric circuit coupling each of said two magnetometers to its associated electric motor whereby each motor is caused to rotate in respouse to the magnitude and phase of the second harmonic voltage generated in its associated magnetometer to maintain the principal axes of said two magnetometers substantially normal to the direction of the magnetic field, and the principal axis of the third magnetometer in substantial alignment with said field, and an electric squaring means for squaring the amplitudes of the second harmonic voltages generated in the three magnetometers, a separate rectifier for each of the squared voltages, a circuit combining into one current the direct current from each of said rectifiers, and an indicator responsive to the combined direct current.

2. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate a voltage of second harmonic frequency therein proportional to the product of the field strength and the direction cosine of the angle formed by the principal magnetic axis of each magnetometer with the direction of the magnetic field to be measured, an electromechanical orienting system therefor comprising two two-phase electric motors one for each of two of said magnetometers, a mechanical linkage from each of said motors to its associated magnetometer whereby the motors may rotate their associated magnetometers around mutually perpendicular axes, a source of alternating current of frequency exactly equal to said second harmonic frequency coupled to one of the phases of each of said motors, an electric circuit coupling each of said two magnetometers to the remaining phase of its associated electric motor whereby each motor is caused to rotate in response to the magnitude and phase of the second harmonic voltage generated in its associated magnetometer to maintain the principal axes of said two magnetometers substantially normal to the direction of the magnetic field and the principal axis of the third magnetometer in substantial alignment with said field, and an electric squaring means for squaring the amplitudes of the second harmonic voltages generated in the three magnetometers, a separate rectifier for each of the squared voltages, a circuit combining into one current the direct current from each of said rectifiers, and an indicator responsive to the combined direct current.

3. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate a voltage of second harmonic frequency therein proportional to the product of the field strength and the direction cosine of the angle formed by the principal magnetic axis of each magnetometer with the direction of the magnetic field to be measured, an electromechanical orienting system therefor comprising two two-phase electric motors one for each of two of said magnetometers, a mechanical linkage from each of said motors to its associated magnetometer whereby the motors may rotate their associated magnetometers around mutually perpendicular axes, an electric circuit coupling the third of said magnetometers to one of the phases of each of said motors, another electric circuit coupling each of said two magnetometers to the remaining phase of its associated electric motor whereby each motor is caused to rotate in response to the magnitude and phase of the second harmonic voltage generated in its associated magnetometer to maintain the principal axes of said two magnetometers substantially normal to the direction of the magnetic field and the principal axis of the third magnetometer in substantial alignment with said field, and an electric squaring means for squaring the amplitudes of the second harmonic voltages generated in the three magnetometers, a separate rectifier for each of the squared voltages, a circuit combining into one current the direct current from each of said rectifiers, and an indicator responsive to the combined direct current.

4. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate a voltage of second harmonic frequency therein proportional to the product of the field strength and the direction cosine of the angle formed by the principal magnetic axis of each magnetometer with the direction of the magnetic field to be measured, an electromechanical orienting system therefor comprising two two-phase electric motors one for each of two of said magnetometers, a mechanical linkage from each of said motors to its associated magnetometer whereby the motors may rotate their associated magnetometers around mutually perpendicular axes, an electric circuit including a phase shift network coupling the third of said magnetometers to one of the phases of each of said motors, another electric circuit coupling each of said two magnetometers to the remaining phase of its associated electric motor whereby each motor is caused to rotate in response to the magnitude and phase of the second harmonic voltage generated in its associated magnetometer to maintain the principal axes of said two magnetometers substantially normal to the direction of the magnetic field and the principal axis of the third magnetometer in substantial alignment with said field, and an electric squaring means for squaring the amplitudes of the second harmonic voltages generated in the three magnetometers, a separate rectifier for each of the squared voltages, a circuit combining into one current the direct current from each of said rectifiers, and an indicator responsive to the combined direct current.

5. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate a voltage of second harmonic frequency therein proportional to the product of the field strength and the direction cosine of the angle formed by the principal magnetic axis of each magnetometer with the direction of the magnetic field to be measured, an electromechanical orienting system therefor comprising two two-phase electric motors, one for each of two of said magnetometers, a mechanical linkage from each of said motors to its associated magnetometer whereby the motors may rotate their associated magnetometers around mutually perpendicular axes, an electric circuit including a phase shift network with resistive and reactive components of relative magnitudes capable of shifting the phase by substantially 90 degrees, coupling the third of said magnetometers to one of the phases of each of said motors, another electric circuit coupling each of said two magnetometers to the remaining phase of its associated electric motor whereby each motor is caused to rotate in response to the magnitude and phase of the second harmonic voltage generated in its associated magnetometer to maintain the principal axes of said two magnetometers substantially normal to the direction of the magnetic field, and the principal axis of the third magnetometer in substantial alignment with said field, and an electric squaring means for squaring the amplitude of the second harmonic voltages generated in the three magnetometers, a separate rectifier for each of the squared voltages, a circuit combining into one current the direct current from each of said rectifiers, and an indicator responsive to the combined direct current.

6. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate a voltage of second harmonic frequency therein proportional to the product of the field strength and the direction cosine of the angle formed by the principal magnetic axis of each magnetometer with the direction of the magnetic field to be measured, an electromechanical orienting system therefor comprising two two-phase electric motors one for each of two of said magnetometers, a mechanical linkage from each of said motors to its associated magnetometer whereby the motors may rotate their associated magnetometers around mutually perpendicular axes, a second harmonic generator connected to said source of alternating current of fundamental frequency, an electric circuit coupling said second harmonic generator to one of the phases of each of said motors, another electric circuit coupling each of said two magnetometers to the remaining phase of its associated electric motor whereby each motor is caused to rotate in response to the magnitude and phase of the second harmonic voltage generated in its associated magnetometer to maintain the principal axes of said two magnetometers substantially normal to the direction of the magnetic field and the principal axis of the third magnetometer in substantial alignment with said field and always aligned in the same direction with respect to the direction of the field, and an electric squaring means for squaring the amplitudes of the second harmonic voltages generated in the three magnetometers, a separate rectifier for each of the squared voltages, a circuit combining into one current the direct current from each of said rectifiers, and an indicator responsive to the combined direct current.

7. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate a voltage of second harmonic frequency therein proportional to the product of the field strength and the direction cosine of the angle formed by the principal magnetic axis of each magnetometer with the direction of the magnetic field to be measured, an electromechanical orienting system therefor comprising two two-phase electric motors, one for each of two of said magnetometers, a mechanical linkage from each of said motors to its associated magnetometer whereby the motors may rotate their associated magnetometers around mutually perpendicular axes, a second harmonic generator including a phase shift network connected to said source of alternating current of fundamental frequency, an electric circuit coupling said second harmonic generator to one of the phases of each of said motors, another electric circuit coupling each of said two magnetometers to the remaining phase of its associated electric motor whereby each motor is caused to rotate in response to the magnitude and phase of the second harmonic voltage generated in its associated magnetometer to maintain the principal axes of said two magnetometers substantially normal to the direction of the magnetic field and the principal axis of the third magnetometer in substantial alignment with said field and always aligned in the same direction with respect to the direction of the field, and an electric squaring means for squaring the amplitudes of the second harmonic voltages generated in the three magnetometers, a separate rectifier for each of the squared voltages, a circuit combining into one current the direct current from each of said rectifiers, and an indicator responsive to the combined direct current.

8. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate a voltage of second harmonic frequency therein proportional to the product of the field strength and the direction cosine of the angle formed by the principal magnetic axis of each magnetometer with the direction of the magnetic field to be measured, an electromechanical orienting system therefor comprising two two-phase electric motors one for each of two of said magnetometers, a mechanical linkage from each of said motors to its associated magnetometer whereby the motors may rotate their associated magnetometers around mutually perpendicular axes, a second harmonic generator including a phase shift network with resistive and reactive components of relative magnitudes capable of shifting the phase by substantially 90 degrees connected to said source of alternating current of fundamental frequency, an electric circuit coupling said second harmonic generator to one of the phases of each of said motors, another electric circuit coupling each of said two magnetometers to the remaining phase of its associated electric motor whereby each motor is caused to rotate in response to the magnitude and phase of the second harmonic voltage generated in its associated magnetometer to maintain the principal axes of said two magnetometers substantially normal to the direction of the magnetic field and the principal axis of the third magnetometer in substantial alignment with said field and always aligned in the same direction with respect to the direction of the field, and an electric squaring means for squaring the amplitudes of the second harmonic voltages generated in the three magnetometers, a separate rectifier for each of the squared voltages, a circuit combining into one current the direct current from each of said rectifiers, and an indicator responsive to the combined direct current.

9. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate voltages of even order harmonic frequencies therein each of magnitude proportional to the product of the field strength and the direction cosine of the angle formed by the principal magnetic axis of each magnetometer with the direction of the magnetic field to be measured, an electromechanical orienting system therefor comprising two reversible electric motors one for each of two of said magnetometers, a mechanical linkage from each of said motors to its associated magnetometer whereby the motors may rotate their associated magnetometers around mutually perpendicular axes, an electric circuit coupling each of said two magnetometers to its associated electric motor whereby each motor is caused to rotate in response to the magnitude and phase of a selected one of said even order harmonic voltages generated in its associated magnetometer to maintain the principal axes of said two magnetometers substantially normal to the direction of the magnetic field, and the principal axis of the third magnetometer in substantial alignment with said field, and an electric squaring means for squaring the amplitudes of selected even order harmonic voltages generated in each of the three magnetometers, a separate rectifier for each of the squared voltages, a circuit combining into one current the direct current from said three rectifiers, and an indicator responsive to the combined direct current.

10. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate even order harmonic voltages therein each of magnitude proportional to the product of the field strength and the direction cosine of the angle formed by the principal magnetic axis of each magnetometer with the direction of the magnetic field to be measured, an electromechanical orienting system therefor comprising two two-phase electric motors one for each of two of said magnetometers, a mechanical linkage from each of said motors to its associated magnetometer whereby the motors may rotate their associated magnetometers around mutually perpendicular axes, a source of alternating current of frequency exactly equal to a selected one of said even order harmonic frequencies coupled to one of the phases of each of said motors, an electric circuit coupling each of said two magnetometers to the remaining phase of its associated electric motor whereby each motor is caused to rotate in response to the magnitude and phase of the selected harmonic voltage generated in its associated magnetometer to maintain the principal axes of said two magnetometers substantially normal to the direction of the magnetic field and the principal axis of the third magnetometer in substantial alignment with said field, and an electric squaring means for squaring the amplitudes of selected even order harmonic voltages generated in each of the three magnetometers, a separate rectifier for each of the squared voltages, a circuit combining into one current the direct current from said three rectifiers, and an indicator responsive to the combined direct current.

11. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate a voltage of second harmonic frequency therein proportional to the product of the field strength and the direction cosine of the angle formed by the principal magnetic axis of each magnetometer with the direction of the magnetic field to be measured, an electromechanical orienting system therefor comprising two two-phase electric motors one for each of two of said magnetometers, said two motors being designed to operate at an operating frequency differing from said fundamental frequency, a mechanical linkage from each of said motors to its associated magnetometer whereby the motors may rotate their associated magnetometers around mutually perpendicular axes, a source of alternating current of said operating frequency derived from said alternating current of fundamental frequency, circuits coupling said source of alternating current of operating frequency to one of the phases of each of said motors, a frequency changer coupling each of said two magnetometers to the remaining phase winding of its associated electric motor, said frequency changer being adapted for changing the frequency of the second harmonic voltage generated in its associated magnetometer to a voltage of said operating frequency whereby each motor is caused to rotate in response to the magnitude and phase of the second harmonic voltage generated in its associated magnetometer to maintain the principal axes of said two magnetometers substantially normal to the direction of the magnetic field and the principal axis of the third magnetometer in substantial alignment with said field, and an electric squaring means for squaring the amplitudes of the second harmonic voltages generated in the three magnetometers, a separate rectifier for each of the squared voltages, a circuit combining into one current the direct current from each of said rectifiers, and an indicator responsive to the combined direct current.

12. A magnetic field strength measuring system comprising in combination three magnetometers having their principal magnetic axes mutually perpendicular, each magnetometer comprising a length of magnetic material with electric windings thereon which are energized with an alternating current of fundamental frequency to generate even order harmonic voltages therein each of magnitude proportional to the product of the field strength and the direction cosine of the angle formed by the principal magnetic axis of each magnetometer with the direction of the magnetic field to be measured, an electromechanical orienting system therefor comprising two two-phase electric motors one for each of two of said magnetometers, said two motors being designed to operate at an operating frequency differing from said fundamental frequency, a mechanical linkage from each of said motors to its associated magnetometer whereby the motors may rotate their associated magnetometers around mutually perpendicular axes, a source of alternating current of said operating frequency derived from said alternating current of fundamental frequency, circuits coupling said source of alternating current of operating frequency to one of the phases of each of said motors, a frequency changer coupling each of said two magnetometers to the remaining phase winding of its associated electric motor, said frequency changer being adapted for changing the frequency of a selected one of said even order harmonic voltages generated in its associated magnetometer to a voltage of said operating frequency whereby each motor is caused to rotate in response to the magnitude and phase of the selected harmonic voltage generated in its associated magnetometer to maintain the principal axes of said two magnetometers substantially normal to the direction of the magnetic field and the principal axis of the third magnetometer in substantial alignment with said field, and an electric squaring means for squaring the amplitudes of selected even order harmonic voltages generated in each of the three magnetometers, a separate rectifier for each of the squared voltages, a circuit combining into one current the direct current from said three rectifiers, and an indicator responsive to the combined direct current.

EDWIN P. FELCH, Jr.
THADDEUS SLONCZEWSKI.

REFERENCES CITED

The following references are of record in the file of this patent:

UNITED STATES PATENTS

| Number | Name | Date |
|---|---|---|
| 1,895,373 | Bruche | Jan. 24, 1933 |
| 2,027,393 | McCreary | Jan. 14, 1936 |
| 2,047,609 | Antranikian | July 14, 1936 |
| 2,053,154 | La Pierre | Sept. 1, 1936 |
| 2,114,283 | Anderson | Apr. 19, 1938 |
| 2,213,357 | Barth | Sept. 3, 1940 |
| 2,308,566 | Noxon | Jan. 19, 1943 |
| 2,331,617 | Moore | Oct. 12, 1943 |
| 2,370,194 | Riggs | Feb. 27, 1945 |